US011338377B2

(12) United States Patent
Ohta et al.

(10) Patent No.: US 11,338,377 B2
(45) Date of Patent: May 24, 2022

(54) POWER TOOL

(71) Applicant: IZUMI PRODUCTS COMPANY, Nagano (JP)

(72) Inventors: Koji Ohta, Kyoto (JP); Naoki Hattori, Kyoto (JP); Isao Haneishi, Nagano (JP)

(73) Assignee: MAXELL IZUMI CO., LTD., Nagano (JP)

( * ) Notice: Subject to any disclaimer, the term of this patent is extended or adjusted under 35 U.S.C. 154(b) by 307 days.

(21) Appl. No.: 16/303,365

(22) PCT Filed: May 23, 2017

(86) PCT No.: PCT/JP2017/019138
§ 371 (c)(1),
(2) Date: Nov. 20, 2018

(87) PCT Pub. No.: WO2017/204198
PCT Pub. Date: Nov. 30, 2017

(65) Prior Publication Data
US 2020/0316697 A1    Oct. 8, 2020

(30) Foreign Application Priority Data

May 24, 2016 (JP) .............................. JP2016-103779
May 19, 2017 (JP) .............................. JP2017-099558

(51) Int. Cl.
*B23D 35/00* (2006.01)
*B23D 29/00* (2006.01)
*H02G 1/12* (2006.01)

(52) U.S. Cl.
CPC ......... *B23D 35/005* (2013.01); *B23D 29/002* (2013.01); *B23D 35/001* (2013.01); *H02G 1/1221* (2013.01)

(58) Field of Classification Search
CPC .. B23D 35/005; B23D 35/002; B23D 35/001; H02G 1/1221
See application file for complete search history.

(56) References Cited

U.S. PATENT DOCUMENTS 3,255,525 A * 6/1966 Frenzel .................. B26B 17/02
30/180
5,360,213 A * 11/1994 Crowley ................. B42F 21/02
270/39.05

(Continued)

FOREIGN PATENT DOCUMENTS

EP    0 812 044    12/1997
EP    1 350 428    10/2003

(Continued)

OTHER PUBLICATIONS

Extended European Search Report dated Jan. 10, 2020 in corresponding European Patent Application No. 17802784.3.

(Continued)

*Primary Examiner* — Evan H MacFarlane
*Assistant Examiner* — Fernando A Ayala
(74) *Attorney, Agent, or Firm* — Wenderoth, Lind & Ponack, L.L.P.

(57) ABSTRACT

A power tool includes a cutting unit configured to perform a cutting action, and a cutting action input unit configured to turn the cutting action on and off. The cutting action input unit is configured to, when the cutting action input unit is turned on, cause the cutting unit to move in a direction of an end position of the cutting action, and when the cutting action input unit is turned off, cause the cutting unit to stop moving in a case where the cutting action has not ended at a time when the cutting action input unit is turned off, and move in a direction of a standby position at which the cutting unit was located prior to a start of the cutting action in a case (Continued)

where the cutting action has ended at the time when the cutting action input unit is turned off.

6 Claims, 14 Drawing Sheets

(56) References Cited

U.S. PATENT DOCUMENTS

| | | | | |
|---|---|---|---|---|
| 5,642,566 | A * | 7/1997 | Hirabayashi | B23D 23/00 30/228 |
| 5,987,754 | A | 11/1999 | Hirabayashi et al. | |
| 6,276,975 | B1 * | 8/2001 | Knight | B63H 20/007 440/2 |
| 8,385,809 | B2 * | 2/2013 | Shiokawa | B26D 1/08 399/407 |
| 2006/0159508 | A1 * | 7/2006 | Mori | B41J 11/663 400/621 |
| 2007/0280805 | A1 * | 12/2007 | Sasamoto | B42C 11/04 412/11 |
| 2010/0050839 | A1 * | 3/2010 | Miyatani | G01N 1/06 83/155.1 |
| 2010/0269355 | A1 | 10/2010 | Yang et al. | |
| 2012/0237321 | A1 * | 9/2012 | Akiyama | G11B 15/6895 414/222.02 |
| 2015/0321283 | A1 * | 11/2015 | Hatada | B23K 11/3063 219/86.25 |
| 2017/0252912 | A1 * | 9/2017 | Barezzani | B25B 27/10 |

FOREIGN PATENT DOCUMENTS

| | | |
|---|---|---|
| EP | 2 407 277 | 1/2012 |
| FR | 2 611 549 | 9/1988 |
| JP | 63-111872 | 7/1988 |
| JP | 3-86417 | 4/1991 |
| JP | 6-75617 | 10/1994 |
| JP | 7-3918 | 1/1995 |
| JP | 8-294585 | 11/1996 |
| JP | 10-249073 | 9/1998 |
| JP | 2005-224122 | 8/2005 |
| JP | 3780391 | 5/2006 |
| WO | 2012/088695 | 7/2012 |

OTHER PUBLICATIONS

International Search Report (ISR) dated Jul. 11, 2017 in International (PCT) Application No. PCT/JP2017/019138.

* cited by examiner

POWER TOOL

TECHNICAL FIELD

The present invention relates to power tools and, in particular, power tools that cut objects.

BACKGROUND ART

Hydraulic or battery-powered power tools-more specifically, electrical cable cutters are used when cutting cables during electrical construction work, or steel bars and the like at ironworks, building construction sites, or the like.

These types of electrical cable cutters need to have their cutter (blade) used to cut objects returned to its standby position prior to the start of the cutting action, after the cutting action has ended.

With regard to this problem, a hydraulic cable cutter is proposed that is only turned on while its switch is being pressed, and when the switch is released, the switch valve is switched automatically and the cutter opens again (see, for example, Patent Literature (PTL) 1). Moreover, a cable cutter with a dust-proof brush is proposed that includes a lock knob disposed between a forward switch lever that causes its electric motor to go on forward drive, and a reverse switch lever that causes its electric motor to go on reverse drive, with each switch lever being put in the on state by being pressed simultaneously with the lock knob (see, for example, PTL 2).

CITATION LIST

Patent Literature

[PTL 1] Japanese Unexamined Utility Model Application Publication No. 6-75617.
[PTL 2] Japanese Unexamined Utility Model Application Publication No. 7-3918.

SUMMARY OF INVENTION

Technical Problem

However, in the invention according to above PTL 1, the cutter would open when the switch is released, which could lead to a decrease in work efficiency. Moreover, in order to reduce this decrease in work efficiency, the operator had to continuously keep the switch pressed until the cutting action had ended, which placed a burden on the operator. Furthermore, in the invention according to above PTL 2, since the forward and reverse switch levers are separate, the operator had to put the reverse switch lever in the on state each time to return the cutter to the standby position prior to the start of the cutting action, after the cutting action had ended, which placed a burden on the operator.

The present invention aims to solve the above problems by providing a power tool that reduces a decrease in work efficiency and reduces the burden on the operator.

Solution to Problem

A power tool according to a mode of the present invention is characterized by including a cutting unit that performs a cutting action, and a cutting action input unit for turning the cutting action on and off, wherein the cutting action input unit, when turned on, causes the cutting unit to move in a direction of an end position of the cutting action, and when turned off, causes the cutting unit to stop moving in a case where the cutting action has not ended at a time when the cutting action input unit is turned off, and to move in a direction of a standby position prior to a start of the cutting action in a case where the cutting action has ended at the time when the cutting action input unit is turned off.

The power tool according to another mode of the present invention is characterized by including a cutting unit that performs a cutting action, and a cutting action input unit for turning the cutting action on and off, wherein the cutting action input unit, when turned on, causes the cutting unit to move in a direction of an end position of the cutting action, and when turned off, causes the cutting unit to move in the direction of the standby position prior to the start of the cutting action by a movement amount selected from a plurality of preset movement amounts in the case where the cutting action has ended at the time when the cutting action input unit is turned off.

Advantageous Effects of Invention

The present invention provides a power tool that reduces a decrease in work efficiency and reduces the burden on the operator.

DESCRIPTION OF EMBODIMENTS

[First Mode]

Hereinafter, an electrical cable cutter according to an embodiment (a first mode) of a power tool in the present invention will be described with reference to the drawings. Note that each of the embodiments described below shows a preferred specific example in the present invention. Numerical values, shapes, materials, components, placement and connection of the components, the processes of controllers and their order, and the like are mere examples and are not intended to limit the present invention. Moreover, components in the following embodiments not mentioned in any of the independent claims that define the broadest concepts are described as optional elements. Note that the following drawings are schematic diagrams and do not necessarily provide strictly accurate illustrations.

Figure 1:
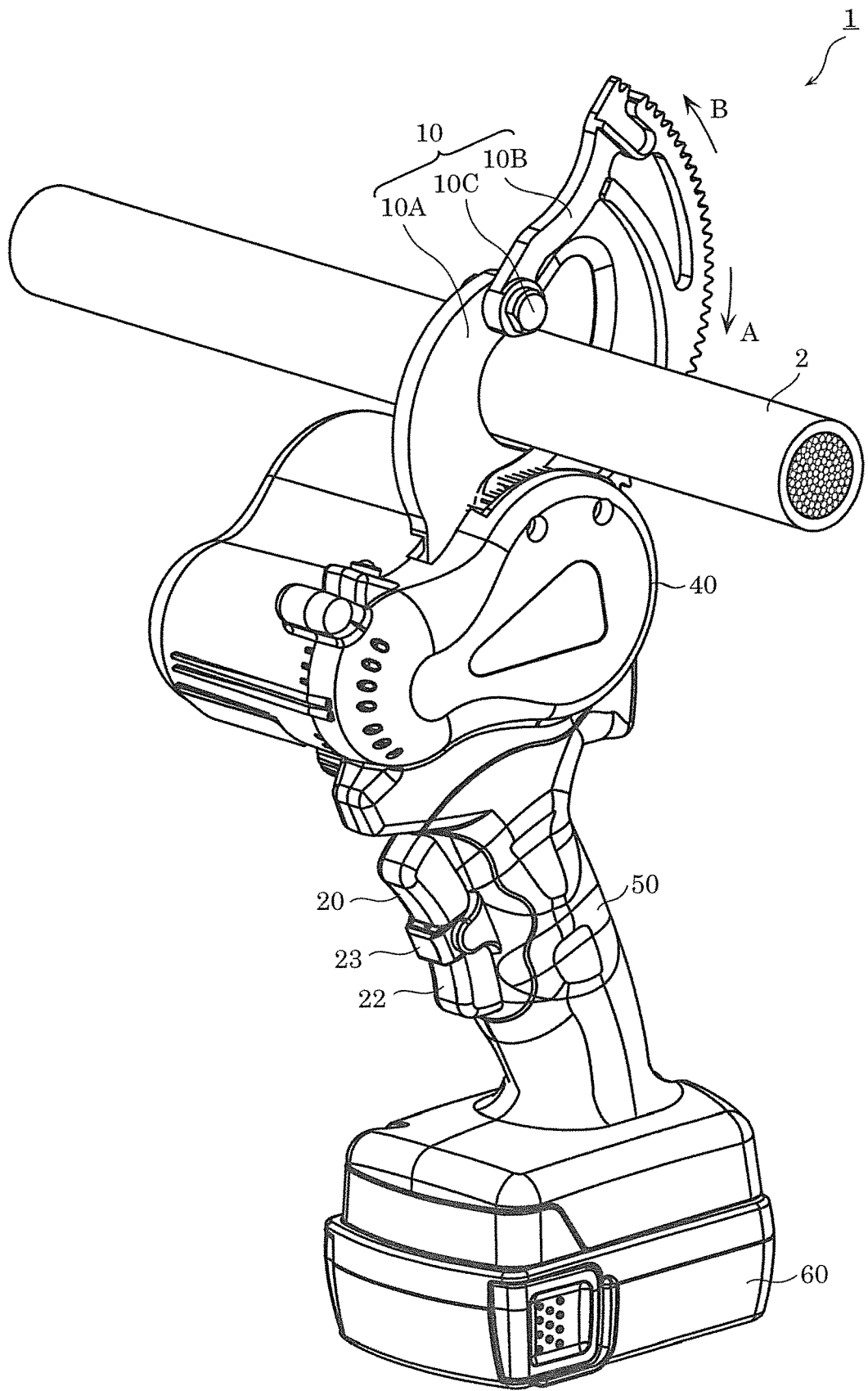
FIG. 1 is an outline diagram showing a configuration of electrical cable cutter 1 according to an embodiment in the present invention (first mode).

A configuration of electrical cable cutter 1 according to the present embodiment will be described concretely below. FIG. 1 is an outline diagram showing the configuration of electrical cable cutter 1 according to the present embodiment.

As illustrated in FIG. 1, electrical cable cutter 1 includes cutting unit 10 that performs a cutting action, and cutting action input unit 20 for turning the cutting action on and off. Moreover, cutting action input unit 20, when turned on, causes cutting unit 10 to move in the direction of an end position of the cutting action (direction A in FIG. 1), and when turned off, causes cutting unit 10 to stop moving in the case where the cutting action has not ended at the time when the cutting action input unit is turned off, and to move in the direction of a standby position prior to the start of the cutting action (direction B in FIG. 1) in the case where the cutting action has ended at the time when the cutting action input unit is turned off.

Note that "the direction of an end position of the cutting action" is the direction toward the end position of the cutting action when cutting unit 10 cuts cutting target 2, that is, the direction in which cutting unit 10 cuts cutting target 2. Moreover, "the direction of a standby position prior to the start of the cutting action" is the direction toward a start position of the cutting action when cutting unit 10 cuts cutting target 2, that is, the direction opposite to the direction in which cutting unit 10 cuts cutting target 2.

In this manner, in electrical cable cutter 1 according to this embodiment of the power tool in the present invention, even when cutting action input unit 20 is turned off before the cutting action performed on cutting target 2 has ended, movement of cutting unit 10 in the direction of the end position of the cutting action is stopped and cutting unit 10 does not move in the direction of the standby position prior to the start of the cutting action, and thus the previously mentioned decrease in work efficiency can be reduced. Moreover, in electrical cable cutter 1, since cutting unit 10 automatically moves in the direction of the standby position prior to the start of the cutting action, after the cutting action has ended, the operator does not have to put a reverse switch lever in the on state each time to return the cutter to the standby position prior to the start of the cutting action. Therefore, the burden on the operator can be reduced.

Cutting unit 10 is coupled to an upper portion of a resin (plastic) housing 40, and includes, for example, fixed blade 10A fixed to an end portion of housing 40 using a commonly-known means not illustrated in the drawings, and rotary blade 10B that is substantially fan-shaped and rotatably connected at approximately the center of curvature of the arc of this fan shape by connector 10C disposed on an end portion of fixed blade 10A.

Included inside housing 40 is a commonly-known drive mechanism ((i) including, for example, an electric motor as illustrated in Japanese Patent No. 3780391, a clutch mechanism driven by a driving gear of the electric motor, a planetary gear deceleration mechanism driven via the clutch mechanism, and a driving gear that is connected to the planetary gear deceleration mechanism and protrudes from the end portion of housing 40, and (ii) in which a plurality of constrained gears, which are driven by the driving gear of the planetary gear deceleration mechanism, sequentially mesh with gear teeth formed on the outer edge of the arc of the rotary blade and cause the rotary blade to rotate about the axis, are disposed along the rotation trajectory of the outer edge of this rotary blade) not illustrated in the drawings that drives the movement of cutting unit 10 (rotation of rotary blade 10B in the present embodiment).

Electrical cable cutter 1 according to the present embodiment cuts cutting target 2, such as a cable, by moving cutting unit 10 driven by the electric motor. Note that the driving power of the electric motor is, for example, supplied from battery cartridge 60 detachably mounted on handle 50 which is disposed across housing 40 from cutting unit 10. Battery cartridge 60 is detachably mounted on a side of handle 50 which is opposite to the side facing housing 40.

Cutting action input unit 20 is, for example, disposed on an outer surface of handle 50.

In the present embodiment, by turning on (preferably pressing) cutting action input unit 20, the drive mechanism is activated and cutting unit 10 moves in the direction of the end position of the cutting action. Moreover, by turning off (preferably releasing from the pressed state) cutting action input unit 20, movement of cutting unit 10 in the direction of the end position of the cutting action is stopped by deactivating the drive mechanism (more specifically, stopping the power supply from battery cartridge 60 to the electric motor) in the case where the cutting action has not ended at the time when the cutting action input unit is turned off. Moreover, when cutting action input unit 20 is off, cutting unit 10 is caused to move in the direction of the standby position prior to the start of the cutting action in the case where the cutting action has ended, by reversing the electric motor in the drive mechanism.

As illustrated in FIG. 1, electrical cable cutter 1 according to the present embodiment further includes, aside from cutting action input unit 20, reverse input unit 22 which, by being turned on (preferably being pressing) reverses the electric motor in the drive mechanism to thereby cause cutting unit 10 to move in the direction of the standby position prior to the start of the cutting action, and by being turning off (preferably by being released from the pressed state) stops the movement in the direction of the standby position.

By further including this reverse input unit 22, a decrease in work efficiency can be kept to a minimum since the operator can personally adjust the movement amount in the direction of the standby position of cutting unit 10 even when some sort of malfunction occurs during the cutting action.

Moreover, electrical cable cutter 1 may further include lock knob 23 that puts one of cutting action input unit 20 and reverse input unit 22 in the on state by being pressing simultaneously with the one of cutting action input unit 20 and reverse input unit 22. By including this lock knob 23, the safety of electrical cable cutter 1 during operation can be further improved.

As previously mentioned, the detection of the end of the cutting action of electrical cable cutter 1 according to the present embodiment is performed through the motor load current in the drive mechanism.

Figure 2:
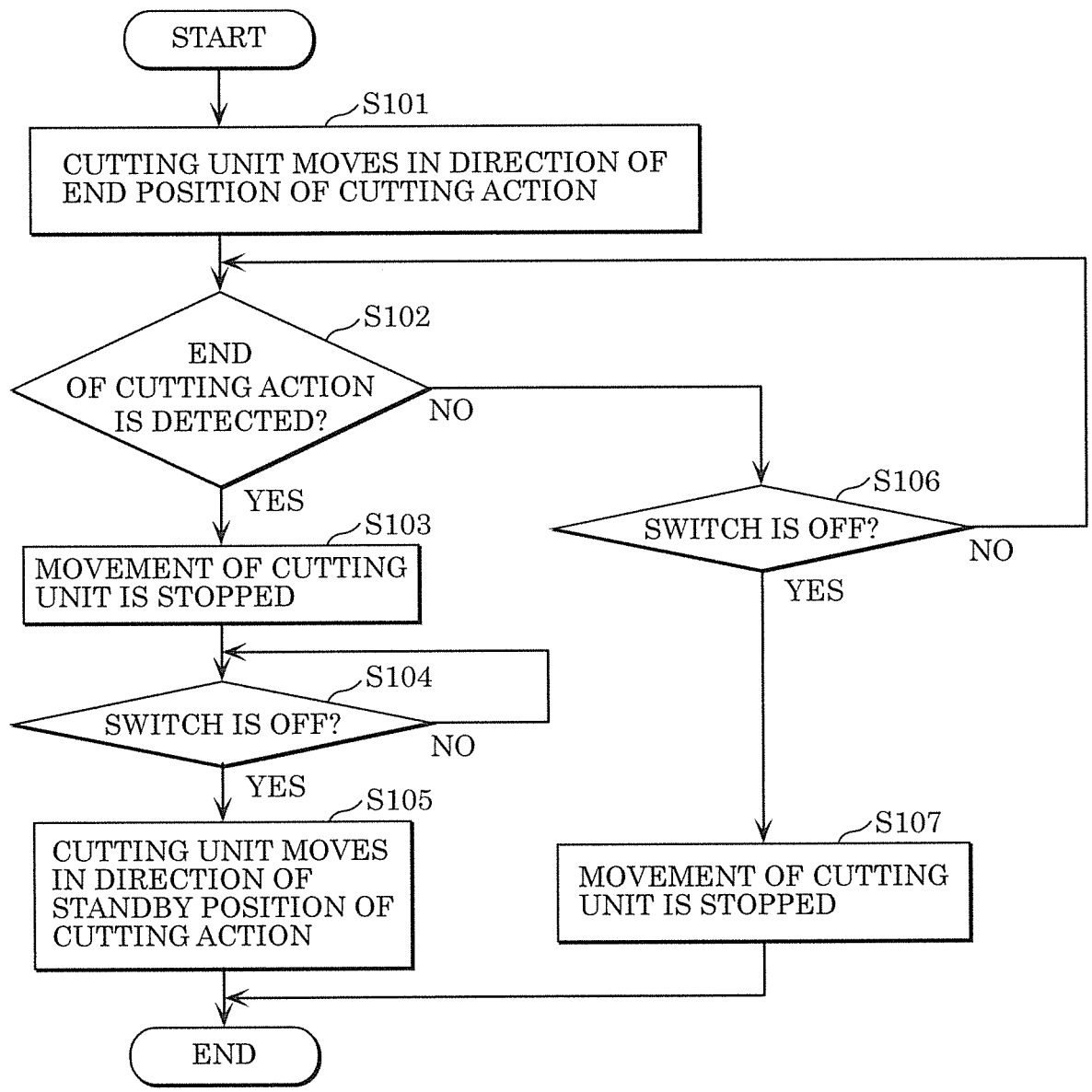
FIG. 2 is a flowchart showing an example of a cutting operation of electrical cable cutter 1 in FIG. 1.

FIG. 2 is a flowchart showing an example of the cutting action of electrical cable cutter 1 according to the present embodiment.

As illustrated in FIG. 2, in the present embodiment, by turning on cutting action input unit 20, cutting unit 10 first moves from the standby position prior to the start of the cutting action in the direction of the end position of the cutting action, and thereby cuts cutting target 2 (S101). Next, the end of the cutting action performed on cutting target 2 is detected (S102). When the end of the cutting action performed on cutting target 2 is detected in S102 ("Yes" in FIG. 2), movement of cutting unit 10 in the direction of the end position of the cutting action (S103) is stopped. Subsequently, it is determined whether cutting action input unit 20 (switch in FIG. 2, same hereinafter) is turned off (S104). Next, when it is determined that cutting action input unit 20 is turned off in S104 ("Yes" in FIG. 2), cutting unit 10 is caused to move in the direction of the standby position prior to the start of the cutting action (S105). Moreover, when it is determined that cutting action input unit 20 is not turned off in S104 ("No" in FIG. 2), S103 (stoppage of movement of cutting unit 10) is continued until cutting action input unit 20 is turned off. However, when the end of the cutting action performed on cutting target 2 is not detected in S102 ("No" in FIG. 2), it is determined next whether cutting action input unit 20 is turned off (S106). When it is determined that cutting action input unit 20 is turned off in S106 ("Yes" in FIG. 2), cutting unit 10 is caused to stop moving in the direction of the end position of the cutting action (S107). Moreover, when it is determined that cutting action input unit 20 is not turned off in S106 ("No" in FIG. 2), movement of cutting unit 10 in the direction of the end position of the cutting action is continued until the end of the cutting action is detected in S102.

In the cutting by electrical cable cutter 1 according to the present embodiment, the operator, for example, holds handle 50 with battery cartridge 60 mounted thereon with one hand, and places cutting target 2 between fixed blade 10A and rotary blade 10B. The cutting action is performed by turning on cutting action input unit 20.

With this, rotary blade 10B is pulled into fixed blade 10A by the drive mechanism and cutting target 2 can be cut.

In this manner, in electrical cable cutter 1 according to the present embodiment, cutting unit 10 is caused to move in the direction of the standby position prior to the start of the cutting action, without having to operate reverse input unit 22 in the case where the cutting action has ended.

Note that, in this case, electrical cable cutter 1 preferably further includes a movement amount adjuster not illustrated in the drawing for adjusting the movement of cutting unit 10 in the direction of the standby position.

This movement amount adjuster is, for example, designed to enable the movement amount in the direction of the standby position to be adjusted freely through a dedicated dial and the like. The movement amount adjuster includes an adjustment circuit that adjusts the power supply time to the drive mechanism when cutting unit 10 is moving in the direction of the standby position.

With this, since the operator can freely set the movement amount (return amount) of cutting unit 10 in the direction of the standby position, work efficiency can be improved when cutting a cable with a small internal diameter after having cut a cable with a large internal diameter.

Note that the movement amount adjuster may be capable of setting the power supply time at a plurality of settings (aperture amount at multiple gradations) through the adjustment circuit. In this case, the movement amount adjuster can cause cutting unit 10 to move up to the start position of the cutting action set through the dedicated dial.

Moreover, electrical cable cutter 1 may further include a function input unit for turning the function in S105 illustrated in FIG. 2 on and off depending on the usage of the operator. In other words, electrical cable cutter 1 may further include a switch unit for turning the function in S105 on and off based on an external instruction and the like. Note that in the present embodiment, the turning on and off of the function in S105 can be achieved by further including in the drive mechanism a switch unit (a switch and so on) including a switch circuit that can turn the function for causing the electric motor in the drive mechanism to reverse on and off.

Moreover, in electrical cable cutter 1 according to the present embodiment, by further including this function input unit or reverse input unit 22, the operator can freely cause cutting unit 10 to move in the direction of the standby position prior to the start of the cutting action. Therefore, the versatility of the cutting by the operator is improved during cutting.

Here, the cutting action is preferably detected (detection of the end of the cutting action in S102) by detecting both the cutting start and end performed on cutting target 2 by cutting unit 10.

Figure 3:
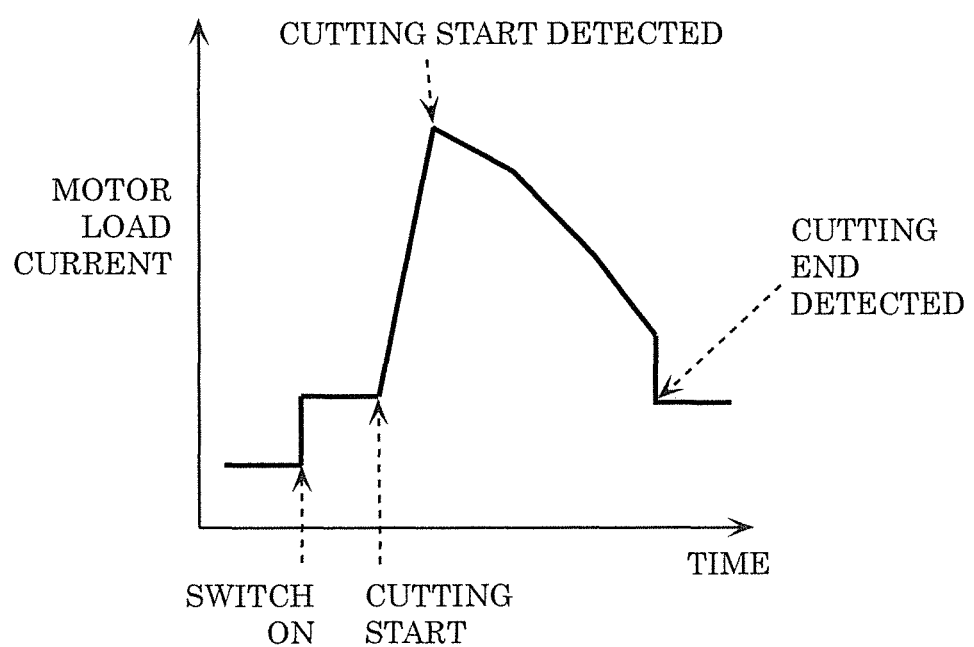
FIG. 3 is an outline diagram for describing an example of detecting an end of the cutting action of electrical cable cutter 1 in FIG. 1.

FIG. 3 is an outline diagram for describing an example of detecting the end of the cutting action of electrical cable cutter 1 according to the present embodiment.

As illustrated in FIG. 3, the detection of the end of the cutting action of electrical cable cutter 1 according to the present embodiment, that is, the detection of the start and end of cutting of cutting target 2 by cutting unit 10, is performed by detecting the value of the motor load current, which is the current for causing the electric motor to move. In other words, the start of cutting of cutting target 2 by cutting unit 10 is detected when the motor load current is greater than or equal to a predetermined value (or in a predetermined range) during or after the start of cutting. Furthermore, the end of cutting of cutting target 2 by cutting unit 10 is detected when the motor load current is less than the predetermined value (or in a predetermined range). When both the cutting start and end are detected, it is determined that the end of the cutting action has been detected in S102 of FIG. 2.

In this manner, detecting both the start and end of cutting makes determining in the case where the cutting action has ended easy, and thus preferable.

Note that in the above embodiment (FIG. 1), electrical cable cutter 1 includes reverse input unit 22, but may also not include reverse input unit 22. Similarly, electrical cable cutter 1 need not include lock knob 23.

Moreover, in the above embodiment, cutting unit 10 has a retractable structure, but may also have a scissor-like structure that cuts cutting target 2 by clamping on it.

Moreover, the present invention can be suitably applied not only to cable cutters, but also to other power tools (such as reinforcing steel cutters) that include the above cutting unit that moves in a fashion described above.

Note that in the present invention, the concept of "cable" includes not only cables, but also steel rods and the like.

[Second Mode]

Hereinafter, the electrical cable cutter according to another embodiment (a second mode) of the power tool in the present invention will be described with reference to the drawings. Note that each of the embodiments described below shows a preferred specific example in the present invention. Numerical values, shapes, materials, components, placement and connection of the components, the processes of controllers and their order, and the like are mere examples and are not intended to limit the present invention. Moreover, components in the following embodiments not mentioned in any of the independent claims that define the broadest concepts are described as optional elements. Note that the drawings are schematic diagrams and do not necessarily provide strictly accurate illustrations.

Figure 4:
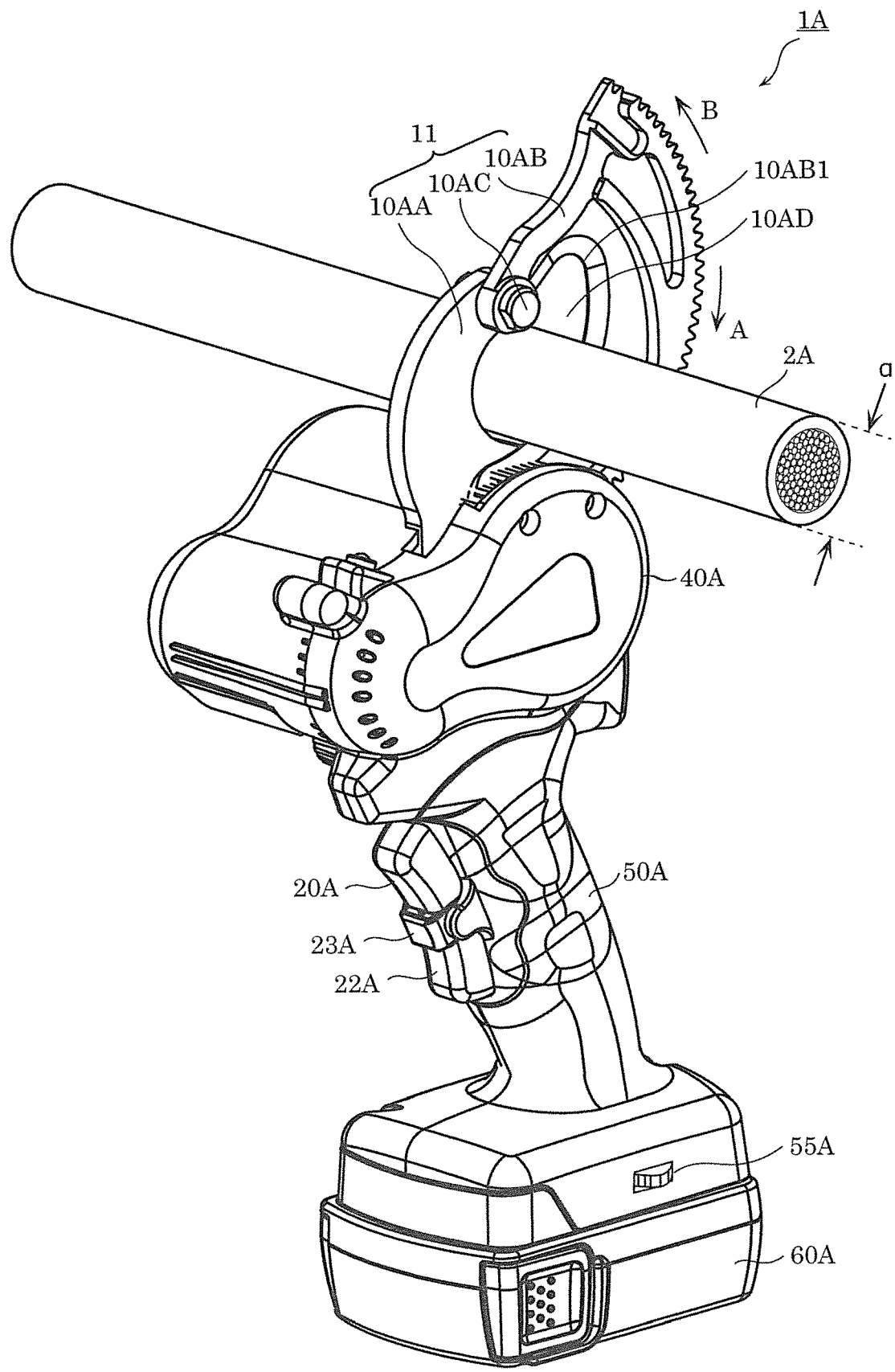
FIG. 4 is an outline diagram showing a configuration of electrical cable cutter 1A according to another embodiment in the present invention (second mode).

Hereinafter, a configuration of electrical cable cutter 1A according to the present embodiment will be described concretely below. FIG. 4 is an outline diagram showing the configuration of electrical cable cutter 1A according to the present embodiment.

As illustrated in FIG. 4, electrical cable cutter 1A includes cutting unit 11 that performs a cutting action, and cutting action input unit 20A for turning the cutting action on and off. Moreover, cutting action input unit 20A, when turned on, causes cutting unit 11 to move in the direction of the end position of the cutting action (direction A in FIG. 4), and when turned off, causes cutting unit 11 to move in the direction of the standby position prior to the start of the cutting action (direction B in FIG. 4). Furthermore, in cutting action input unit 20A, a plurality of switchable movement amounts for causing cutting unit 11 to move in the standby position direction B (hereinafter also referred to as return amount) are set.

Note that "the direction of the end position of the cutting action" is the direction toward the end position of the cutting action when cutting unit 11 cuts cutting target 2A, that is, the direction in which cutting unit 11 cuts cutting target 2A. Moreover, "the direction of the standby position prior to the start of the cutting action" is the direction toward the start position of the cutting action when cutting unit 11 cuts cutting target 2A, that is, the direction opposite to the direction in which cutting unit 11 cuts cutting target 2A.

In this manner, in electrical cable cutter 1A according to the second mode of the power tool in the present invention, a preferred return amount can be selected according to the cutting conditions of cutting unit 11 since a plurality of switchable return amounts are set.

Therefore, a decrease in productivity can be reduced since the power tool can be made more versatile. Moreover, since the returning to an optimal position is performed automatically without the operator having to personally use a reverse switch lever or the like, the burden on the operator can be reduced.

The return amount can be set, for example, to four degrees (from setting 1 to setting 4).

In electrical cable cutter 1A, the return amount is preferably adjusted by controlling the movement time (electric power supply time) for causing cutting unit 11 to move in the standby position direction B.

To be specific, the return amount is preferably adjusted by disposing an adjustment circuit for adjusting the electric power supply time from battery cartridge 60A to the movement mechanism (motor and the like) which causes cutting unit 11 to move, on the electric power supply line between the movement mechanism and battery cartridge 60A, and controlling the adjustment circuit.

By controlling the movement time (electric power supply time) of the return amount in this manner, the need to install sensors and the like for detecting cutting unit 11 at positions of desired return amounts is eliminated, and thus complication of electrical cable cutter 1A can be reduced and cost reduction becomes possible.

Selection of the return amount through the movement time (electric power supply time) is performed, for example, using selection dial 55A provided on handle 50A (see, FIG. 4).

Selection dial 55A is, for example, marked with settings "1", "2", "3", and "4", and each setting is set to a corresponding electric power supply time via the adjustment circuit (for example, "1" is 10 seconds, "2" is 20 seconds, "3" is 30 seconds, and "4" is 40 seconds). For example, the operator selects a desired setting (for example, "1") of selection dial 55A prior to the cutting start of cutting target 2A, and when, after the cutting action (after cutting action input unit 20A has been turned on), cutting action input unit 20A is turned off, electric power is supplied from battery cartridge 60A to the movement mechanism for the amount of time corresponding to the selected setting (for example, 10 seconds) and cutting unit 11 is caused to move in standby position direction B for that amount of time.

Note that selection dial 55A may also be provided on the surface of handle 50A to which battery cartridge 60A is coupled (between handle 50A and battery cartridge 60A in FIG. 4, and thus not illustrated).

The selection of the return amount is not limited to the use of selection dial 55A, so long as it does not depart from the scope in the present invention. The selection of the return amount may also be performed, for example, using a selection push switch (for example, marked with the numbers "1", "2", "3", and "4", in which the number changes (for example, "from 1 to 2 to 3 to 4 to 1") each time the switch is pushed) or a digital selector (for example, digitally displaying the numbers "1", "2", "3", and "4", and selecting one thereof).

The selection of the return amount when successively cutting cutting target 2A is performed, for example, by having the operator select a desired setting prior to the cutting start of cutting target 2A to be cut next (includes changing the setting of the previous return amount to another setting).

In electrical cable cutter 1A, the selection of the return amount is more preferably performed by using information about at least one of cutting unit 11, cutting target 2A cut by cutting unit 11, and the remaining power level. In other words, in electrical cable cutter 1A, the desired return amount is automatically selected from the plurality of preset return amounts using information relating to at least one of cutting unit 11, cutting target 2A, and the remaining power level. Note that the remaining power level of electrical cable cutter 1A is the remaining battery charge of battery cartridge 60A (dischargeable capacity).

By automatically performing the selection of the return amount, an optimal return amount can be selected according to the conditions of cutting unit 11, cutting target 2A, and the remaining power level.

Therefore, work efficiency when successively cutting cutting target 2A can be further improved. Moreover, since the operator need not personally select the return amount using selection dial 55A or the like, the burden on the operator can be further reduced.

Hereinafter, a specific mode when automatically performing the selection between the plurality of preset return amounts will be described.

Figure 5:
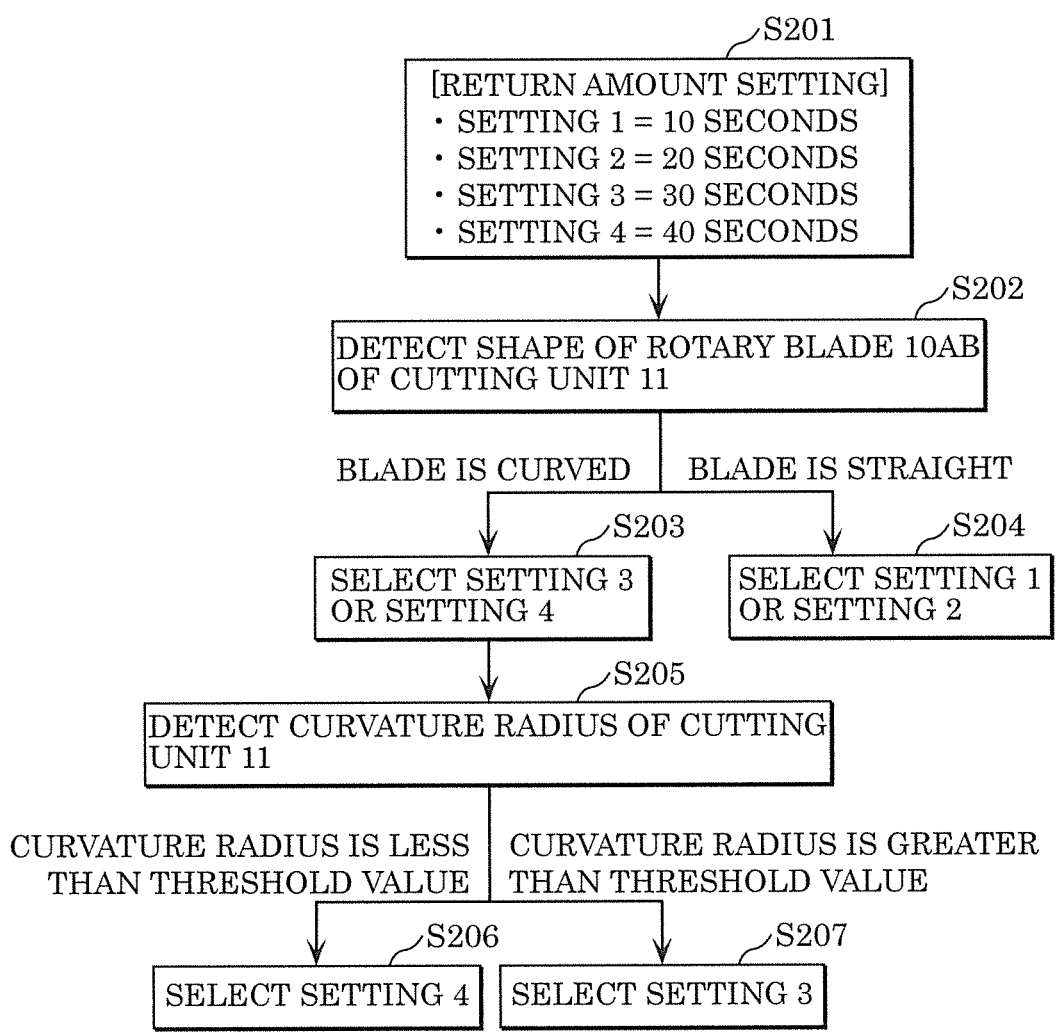
FIG. 5 is a flowchart showing an example of selecting between a plurality of preset return amounts based on information about cutting unit 11.

FIG. 5 is a flowchart showing an example of selecting between the plurality of preset return amounts based on information about cutting unit 11.

As illustrated in FIG. 5, when coupling cutting unit 11 to electrical cable cutter 1A in which, for example, four return amounts are set (S201), the shape of rotary blade 10AB (especially the shape of the portion that comes into contact with cutting target 2A (10AB1 in FIG. 4)) is detected as information about cutting unit 11 by an image sensor (CCD camera and the like) not illustrated in the drawing that is provided inside housing 40A (S202). Next, when the detected shape of rotary blade 10AB is curved as illustrated in FIG. 4, there are cases where it is difficult to insert cutting target 2A to be cut next into cutting space 10AD of electrical cable cutter 1A (cutting target 2A to be cut next easily comes into contact with the curved portion of the blade when inserting cutting target 2A into cutting space 10AD), and thus a large return amount (setting 3 or setting 4) is selected (S203).

When the detected shape of rotary blade 10AB is straight, cutting target 2A is easily inserted into cutting space 10AD (cutting target 2A to be cut next does not easily come into contact with the straight portion of the blade when inserting cutting target 2A into cutting space 10AD), and thus the smallest possible return amount (setting 1 or setting 2) in which cutting target 2A to be cut next can be inserted into cutting space 10AD is selected (S204). Moreover, when setting a large return amount (setting 3 or setting 4) has been selected (S203), the curvature radius of blade shape 10AB1 that comes into contact with cutting target 2A of cutting unit 11 is further detected (S205). When the detected curvature radius is less than a preset threshold value, a large return amount (setting 4) is selected (S206) to make it easier to avoid contact with cutting target 2A, and when the detected curvature radius is greater than the preset threshold value, a small return amount (setting 3) is selected (S207) since it is easy to avoid contact with cutting target 2A.

Figure 6:
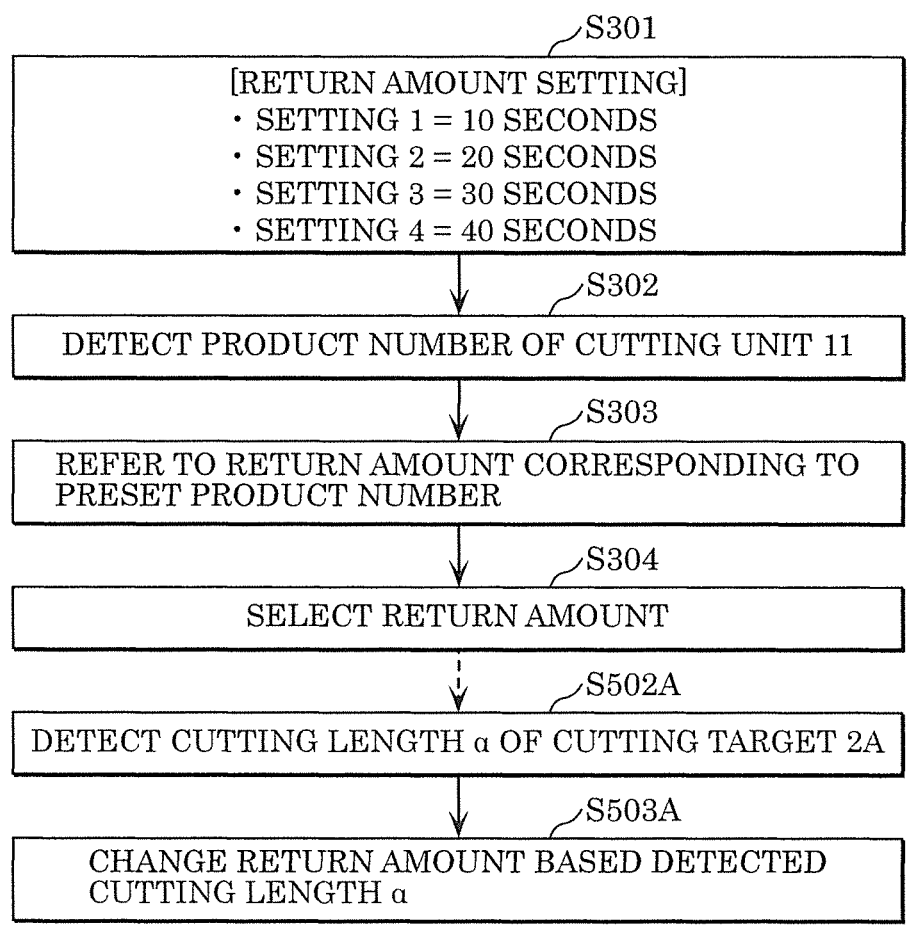
FIG. 6 is a flowchart showing another example of selecting between the plurality of preset return amounts based on information about cutting unit 11.

FIG. 6 is a flowchart showing another example of selecting between the plurality of preset return amounts based on information about cutting unit 11.

As illustrated in FIG. 6, when coupling cutting unit 11 to electrical cable cutter 1A in which, for example, four return amounts are set (S301), the product number that is engraved or numbered on the surface of cutting unit 11 is detected as information about cutting unit 11 by an image sensor (CCD camera and the like) not illustrated in the drawing that is provided inside housing 40A (S302). Next, the detected product number and the preset return amount corresponding to the product number is referred to (S303), and a return amount is selected (S304).

Figure 7:
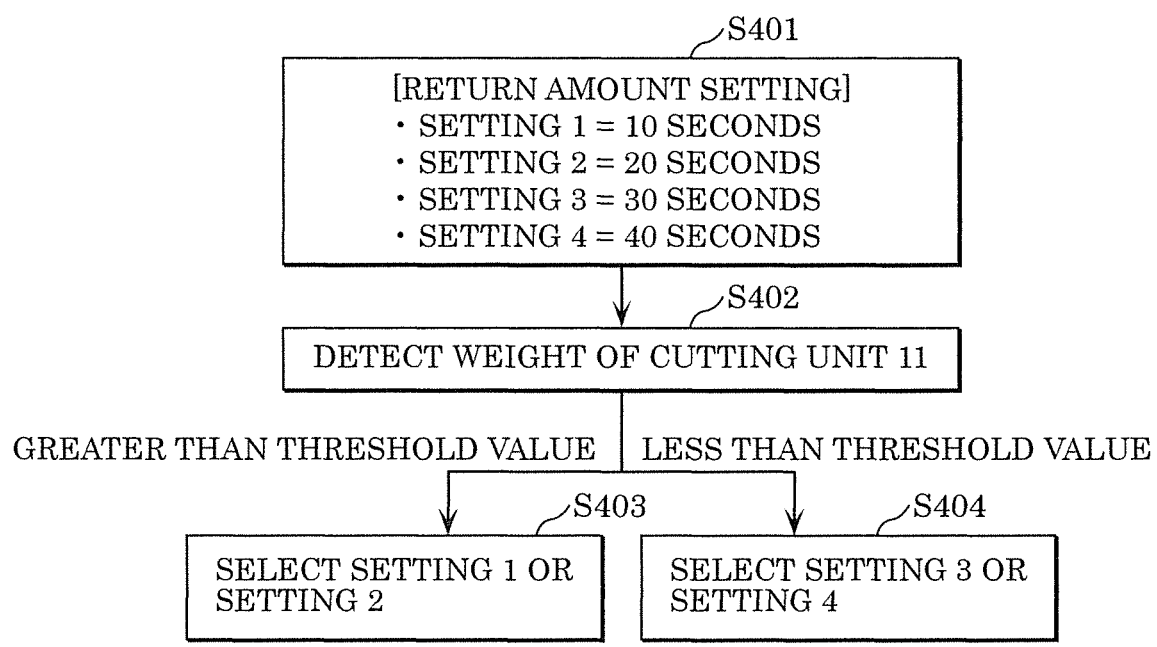
FIG. 7 is a flowchart showing another example of selecting between the plurality of preset return amounts based on information about cutting unit 11.

FIG. 7 is a flowchart showing another example of selecting between the plurality of preset return amounts based on information about cutting unit 11.

As illustrated in FIG. 7, when coupling cutting unit 11 to electrical cable cutter 1A in which, for example, four return amounts are set (S401), the weight of cutting unit 11 is detected as information about cutting unit 11 by a weight sensor not illustrated in the drawing that is provided inside housing 40A (S402). Next, when the detected weight is greater than a preset threshold value, the smallest possible return amount (setting 1 or setting 2) that enables cutting target 2A to be inserted into cutting space 10AD is selected (S403) in order to reduce power consumption. When the detected weight is less than the preset threshold value, a large return amount (setting 3 or setting 4) is selected (S404) since the power consumption is low.

Figure 8:
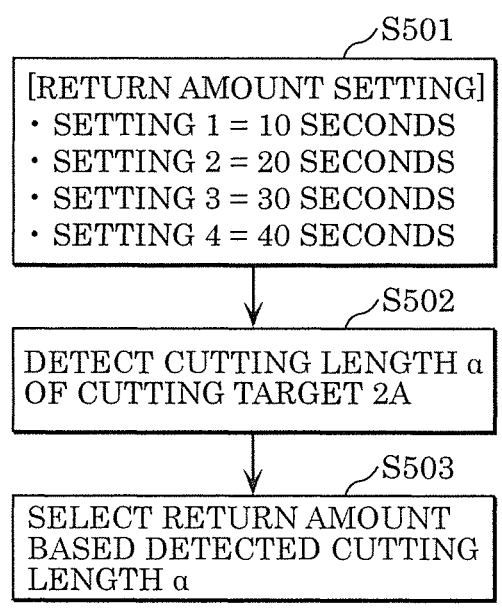
FIG. 8 is a flowchart showing an example of selecting between the plurality of preset return amounts based on information about cutting target 2A.

FIG. 8 is a flowchart showing another example of selecting between the plurality of preset return amounts based on information about cutting target 2A.

As illustrated in FIG. 8, a cutting length ($\alpha$ in FIG. 4) is detected (S502) by an image sensor (CCD camera and the like) not illustrated in the drawing as information about cutting target 2A to be inserted into cutting space 10AD of electrical cable cutter 1A in which, for example, four return amounts are set (S501). Next, the smallest possible return amount that enables cutting target 2A to be inserted into cutting space 10AD is selected (S503) based on the detected cutting length $\alpha$.

Figure 9:
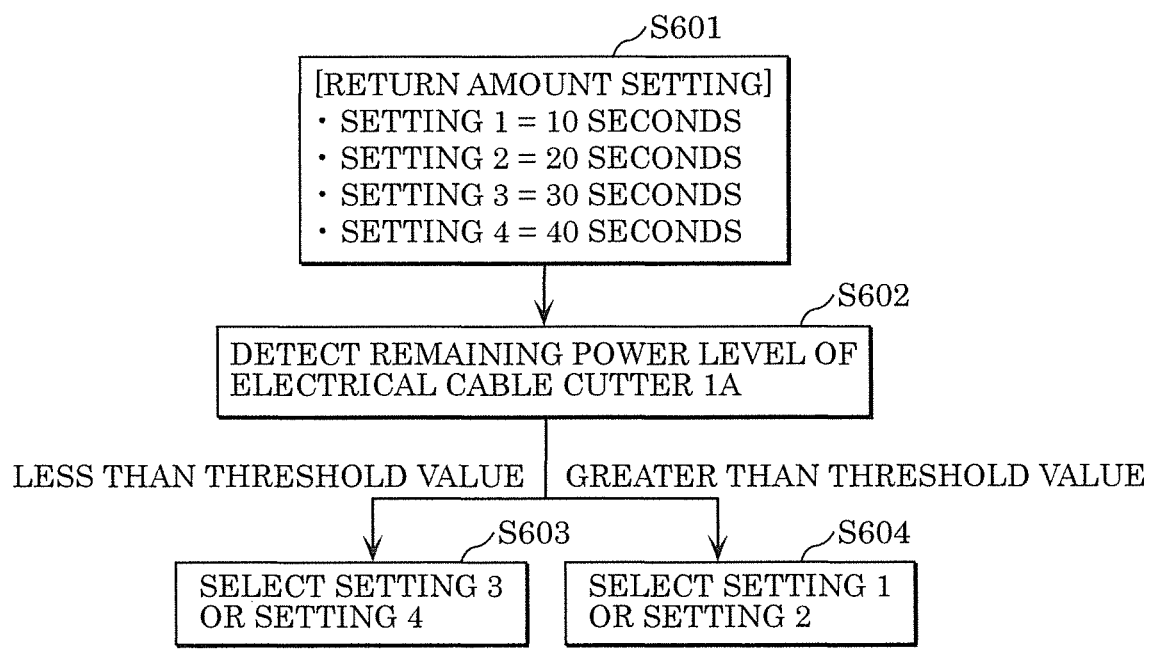
FIG. 9 is a flowchart showing an example of selecting between the plurality of preset return amounts based on remaining power level of electrical cable cutter 1A.

FIG. 9 is a flowchart showing an example of selecting between the plurality of preset return amounts based on the remaining power level of electrical cable cutter 1A.

As illustrated in FIG. 9, using a detection means not illustrated in the drawing in electrical cable cutter 1A in which, for example, four return amounts are set (S601), the remaining power level is detected (S602). Next, when the detected remaining power level is less than a preset threshold value, a setting with a long electric power supply time (setting 3 or setting 4) is selected (S603) since there is a risk of the return speed of cutting unit 11 dropping (decreased return amount). When the detected remaining power level is greater than the preset threshold value, the smallest possible return amount that enables cutting target 2A to be inserted into cutting space 10AD (setting 1 or setting 2) is selected (S604) since there is a low probability of the return speed of cutting unit 11 dropping.

Moreover, when the selection between the plurality of preset return amounts is performed automatically based on information about cutting unit 11 (for example, product number) and cutting target 2A (cutting length), as illustrated in FIG. 6, a return amount corresponding to the product number of cutting unit 11 is selected (S304), then the cutting length ($\alpha$ in FIG. 4) is, for example, detected (S502A) by an image sensor (CCD camera or the like) not illustrated in the drawing as information about cutting target 2A to be inserted into cutting space 10AD. Next, the selected return amount is, for example, changed to a return amount that enables cutting target 2A to be inserted into cutting space 10AD (S503A) based on the detected cutting length $\alpha$.

By adopting such a flowchart, an optimal return amount can be selected even when cutting unit 11 has been changed to one with a different blade shape (with a different product number), and cutting target 2A has been changed to a cutting target with a different cutting length $\alpha$.

Figure 10:
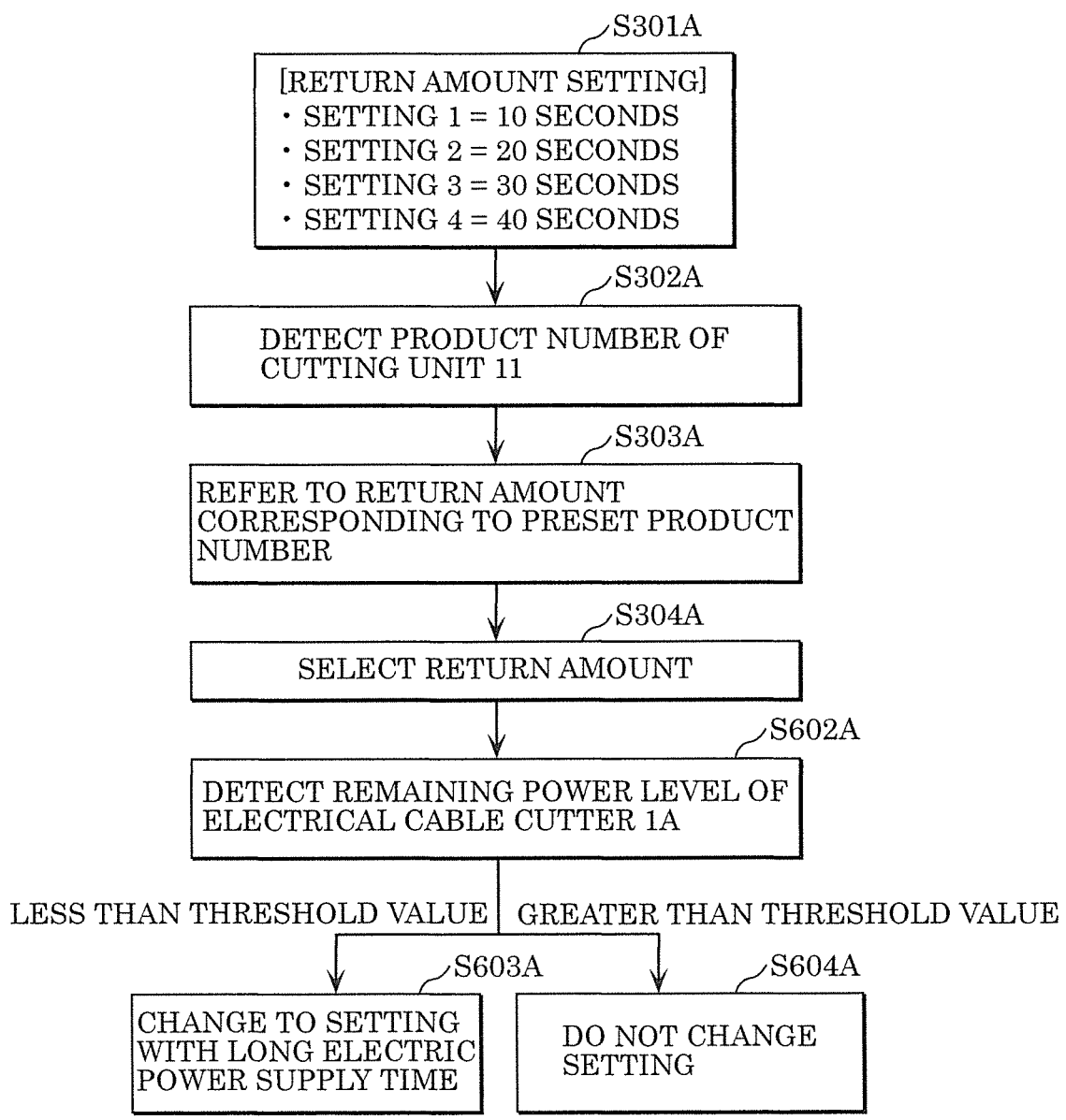
FIG. 10 is a flowchart showing an example of selecting between the plurality of preset return amounts based on information about cutting unit 11 and the remaining power level.

FIG. 10 is a flowchart showing an example of selecting between the plurality of preset return amounts based on information about cutting unit 11 and the remaining power level.

When coupling cutting unit 11 to electrical cable cutter 1A in which, for example, four return amounts are set (S301A), the product number that is engraved or numbered on the surface of cutting unit 11 is detected as information about cutting unit 11 by an image sensor (CCD camera and the like) not illustrated in the drawing that is provided inside housing 40A (S302A). Next, Next, the detected product number and the preset return amount corresponding to the product number is referred to (S303A), and a return amount is selected (S304A). Next, the remaining power level of electrical cable cutter 1A is detected (S602A) using a detection means not illustrated in the drawings; when the detected remaining power level is less than the preset threshold value, the selected return amount is changed to a setting with a long electric power supply time (S603A), and when the detected remaining power level is greater than the preset threshold value, the selected return amount is not changed (S604A).

By adopting such a flowchart, a return amount that enables successive cutting is maintained even when the remaining power level becomes low and the return speed of cutting unit 11 drops (decreased return amount).

Figure 11:
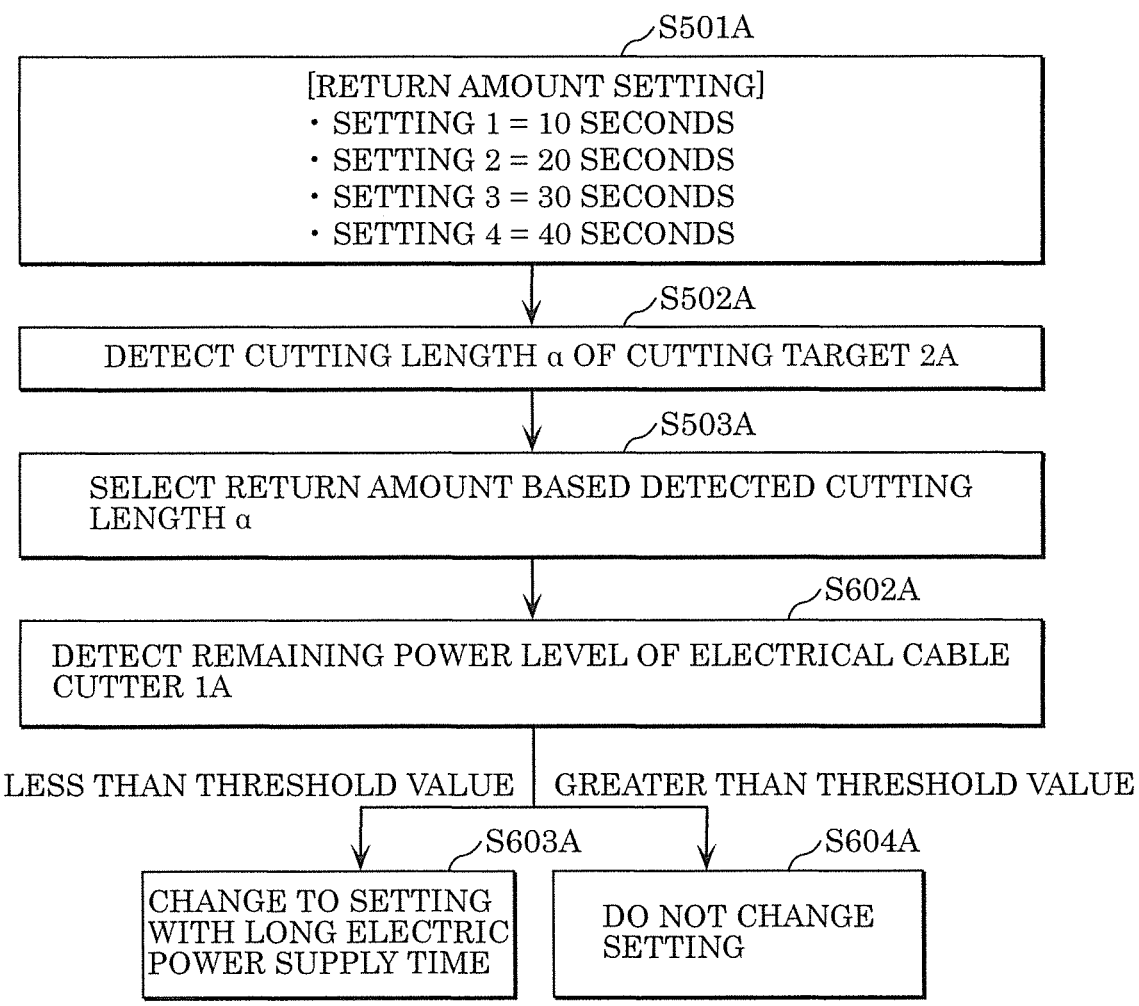
FIG. 11 is a flowchart showing an example of selecting between the plurality of preset return amounts based on information about cutting target 2A and the remaining power level.

FIG. 11 is a flowchart showing an example of selecting between the plurality of preset return amounts based on information about cutting target 2A and the remaining power level.

The cutting length ($\alpha$ in FIG. 4) is detected (S502A) by an image sensor (CCD camera and the like) not illustrated in the drawings as information about cutting target 2A to be inserted into cutting space 10AD of electrical cable cutter 1A in which, for example, four return amounts are set (S501A). Next, the smallest possible return amount that enables cutting target 2A to be inserted into cutting space 10AD is selected (S503A) based on the detected cutting length $\alpha$.

Next, the remaining power level of electrical cable cutter 1A is detected (S602A) using a detection means not illustrated in the drawings; when the detected remaining power level is less than the preset threshold value, the selected return amount is changed to a setting with a long electric power supply time (S603A), and when the detected remaining power level is greater than the preset threshold value, the selected return amount is not changed (S604A).

By adopting such a flowchart, a return amount that enables successive cutting is maintained even when remaining power level becomes low and the return speed of cutting unit 11 drops (decreased return amount).

Note that the various types of controls related to the cutting action of electrical cable cutter 1A, such as the above-mentioned adjustment and selection of the return amount, are, for example, performed via the instructions of a controller (above-mentioned adjustment circuit, or a control circuit, a processor, or the like) not illustrated in the drawings that is disposed in electrical cable cutter 1A.

Cutting unit 11 is coupled to the upper portion of a resin (plastic) housing 40A, and includes, for example, fixed blade 10AA fixed to the end portion of housing 40A using a commonly-known means not illustrated in the drawings, and rotary blade 10AB that is substantially fan-shaped and rotatably connected at approximately the center of curvature of the arc of this fan shape by connector 10AC disposed on the end portion of fixed blade 10AA.

Included inside housing 40A is a commonly-known drive mechanism ((i) including, for example, the electric motor as illustrated in Japanese Patent No. 3780391, the clutch mechanism driven by the driving gear of the electric motor, the planetary gear deceleration mechanism driven via the clutch mechanism, and the driving gear that is connected to the planetary gear deceleration mechanism and protrudes from the end portion of housing 40A, and (ii) in which the plurality of constrained gears, which are driven by the driving gear of the planetary gear deceleration mechanism, sequentially mesh with the gear teeth formed on the outer edge of the arc of the rotary blade and cause the rotary blade to rotate about the axis, are disposed along the rotation trajectory of the outer edge of this rotary blade) not illustrated in the drawings that drives the movement of cutting unit 11 (rotation of rotary blade 10AB in the present embodiment).

Electrical cable cutter 1A according to the present embodiment cuts cutting target 2A, such as a cable, by moving cutting unit 11 driven by the electric motor. Note that the driving power of the electric motor is, for example, supplied from battery cartridge 60A detachably mounted on handle 50A which is disposed across housing 40A from cutting unit 11. Battery cartridge 60A is detachably mounted on the side of handle 50A which is opposite to the side facing housing 40A.

Cutting action input unit 20A is, for example, disposed on the outer surface of handle 50A.

In the present embodiment, by turning on (preferably pressing) cutting action input unit 20A, the drive mechanism is activated and cutting unit 11 moves in the direction of the end position of the cutting action. Moreover, by turning off (preferably releasing from the pressed state) cutting action input unit 20A, cutting unit 11 is caused to move in the direction of the standby position of the cutting action at the time when cutting action input unit 20A is turned off. In other words, cutting action input unit 20A, when turned off, causes cutting unit 11 to move in the direction of the standby position prior to the start of the cutting action by a movement amount selected from the plurality of preset movement amounts.

As illustrated in FIG. 4, electrical cable cutter 1A according to the present embodiment further includes, aside from cutting action input unit 20A, reverse input unit 22A which, by being turned on (preferably being pressing) reverses the electric motor in the drive mechanism to thereby cause cutting unit 11 to move in the direction of the standby position prior to the start of the cutting action, and by being turning off (preferably by being released from the pressed state) stops the movement in the direction of the standby position.

By further including this reverse input unit 22A, a decrease in work efficiency can be kept to a minimum since the operator can personally adjust the movement amount in the direction of the standby position of cutting unit 11 even when some sort of malfunction occurs during the cutting action.

Moreover, electrical cable cutter 1A may further include lock knob 23A that puts one of cutting action input unit 20A and reverse input unit 22A in the on state by being pressing simultaneously with the one of cutting action input unit 20A and reverse input unit 22A. By including this lock knob 23A, the safety of electrical cable cutter 1A during operation can be further improved.

In the cutting by electrical cable cutter 1A according to the present embodiment, the operator, for example, holds handle 50A with battery cartridge 60A mounted thereon with one hand, and places cutting target 2A between fixed blade 10AA and rotary blade 10AB of cutting unit 11. The cutting action is performed by turning on cutting action input unit 20A.

With this, rotary blade 10AB is pulled into fixed blade 10AA by the drive mechanism and cutting target 2A can be cut.

Note that in the above embodiment (FIG. 4), electrical cable cutter 1A includes reverse input unit 22A, but may also not include reverse input unit 22A. Similarly, electrical cable cutter 1A need not include lock knob 23A.

Moreover, in the above embodiment, cutting unit 11 has a retractable structure, but may also have a scissor-like structure that cuts cutting target 2A by clamping on it.

Moreover, the present invention can be suitably applied not only to cable cutters, but also to other power tools (such as reinforcing steel cutters) that include the above cutting unit that moves in a fashion described above.

Note that in the present invention, the concept of "cable" includes not only cables, but also steel rods and the like.

[Third Mode]

Hereinafter, the electrical cable cutter according to another embodiment (a third mode) of the power tool in the present invention will be described with reference to the drawings. Note that each of the embodiments described below shows a preferred specific example in the present invention. Numerical values, shapes, materials, components, placement and connection of the components, the processes of controllers and their order, and the like are mere examples and are not intended to limit the present invention. Moreover, components in the following embodiments not mentioned in any of the independent claims that define the broadest concepts are described as optional elements. Note that the drawings are schematic diagrams and do not necessarily provide strictly accurate illustrations.

Figure 12:
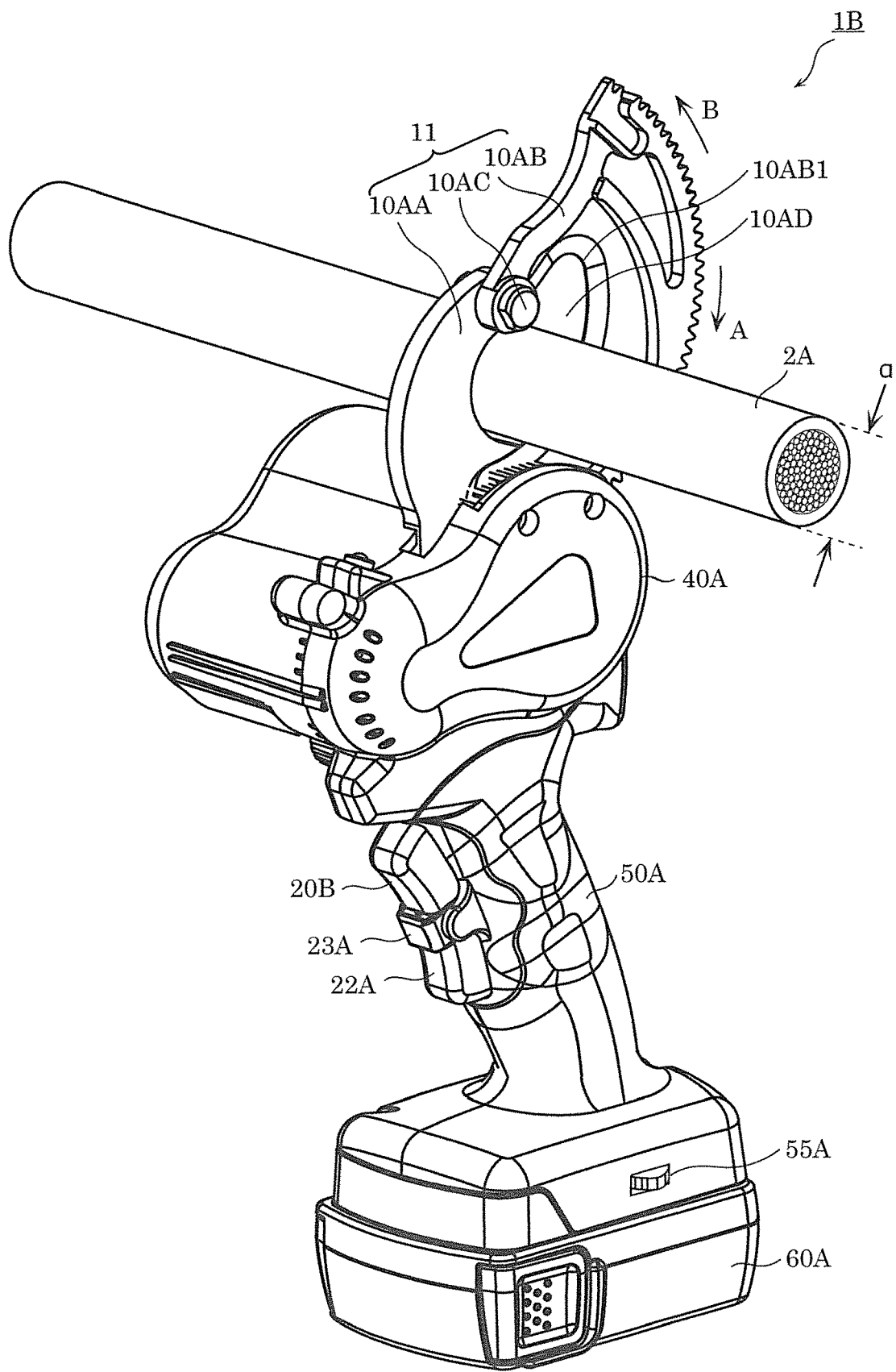
FIG. 12 is an outline diagram showing a configuration of electrical cable cutter 1B according to a different embodiment in the present invention (third mode).

A configuration of electrical cable cutter 1B according to the present embodiment will be described concretely below. FIG. 12 is an outline diagram showing the configuration of electrical cable cutter 1B according to the present embodiment.

Electrical cable cutter 1B according to the present embodiment has a configuration in which cutting action input unit 20A described in the second mode is replaced with cutting action input unit 20B. Everything else is the same as in the second mode, and as such, description thereof is omitted. Moreover, in cutting action input unit 20B, other matters such as the configuration in which a plurality of switchable movement amounts for causing cutting unit 11 to move in the standby position direction B (i.e., return amount) are set, and the selection between the movement amounts (including automatic selection) are all identical to cutting action input unit 20A, and as such, description thereof is omitted.

Cutting action input unit 20B of electrical cable cutter 1B according to the present embodiment, when turned on, causes cutting unit 11 to move in the direction of the end position of the cutting action (direction A in FIG. 12), and when turned off, causes cutting unit 11 to stop moving in the case where the cutting action has not ended at the time when the cutting action input unit is turned off, and to move in the direction of the standby position prior to the start of the cutting action (direction B in FIG. 12) in the case where the cutting action has ended at the time when the cutting action input unit is turned off. Moreover, a plurality of switchable movement amounts for causing cutting unit 11 to move in the standby position direction B (return amounts) are set. In other words, cutting action input unit 20B, when turned off, causes cutting unit 11 to move in the direction of the standby position prior to the start of the cutting action by a movement amount selected from the plurality of preset movement amounts in the case where the cutting action has ended at the time when the cutting action input unit is turned off.

In this manner, in electrical cable cutter 1B according to this embodiment of the power tool in the present invention, even when cutting action input unit 20B is turned off before the cutting action performed on cutting target 2A has ended, movement of cutting unit 11 in the direction of the end position of the cutting action is stopped and cutting unit 11 does not move in the direction of the standby position prior to the start of the cutting action, and thus the previously mentioned decrease in work efficiency can be reduced. Moreover, in electrical cable cutter 1B, since cutting unit 11 automatically moves in the direction of the standby position prior to the start of the cutting action, after the cutting action has ended, the operator does not have to put a reverse switch lever in the on state each time to return the cutter to the standby position prior to the start of the cutting action. Therefore, the burden on the operator can be reduced.

Moreover, in electrical cable cutter 1B according to the third mode of the power tool in the present invention, a preferred return amount can be selected according to the cutting conditions of cutting unit 11 since a plurality of switchable return amounts are set. Therefore, a decrease in productivity can be reduced since the power tool can be made more versatile. Moreover, since the returning to an optimal position is performed automatically without the operator having to personally use a reverse switch lever or the like, the burden on the operator can be further reduced.

In the present embodiment, by turning on (preferably pressing) cutting action input unit 20B, the drive mechanism is activated and cutting unit 11 moves in the direction of the end position of the cutting action. Moreover, by turning off (preferably releasing from the pressed state) cutting action input unit 20B, movement of cutting unit 11 in the direction of the end position of the cutting action is stopped by deactivating the drive mechanism (more specifically, stopping the power supply from battery cartridge 60A to the electric motor) in the case where the cutting action has not ended at the time when cutting action input unit 20B is turned off. Moreover, a plurality of selectable movement amounts are set for causing cutting unit 11 to move in the direction of the standby position prior to the start of the cutting action and to move in the standby position direction B, by reversing the electric motor in the drive mechanism in the case where the cutting action has ended when cutting action input unit 20B is off. In other words, when cutting action input unit 20B is off, cutting unit 11 is caused to move in the direction of the standby position prior to the start of the cutting action by a movement amount selected from the plurality of preset movement amounts, by reversing the electric motor in the drive mechanism in the case where the cutting action has ended.

Figure 13:
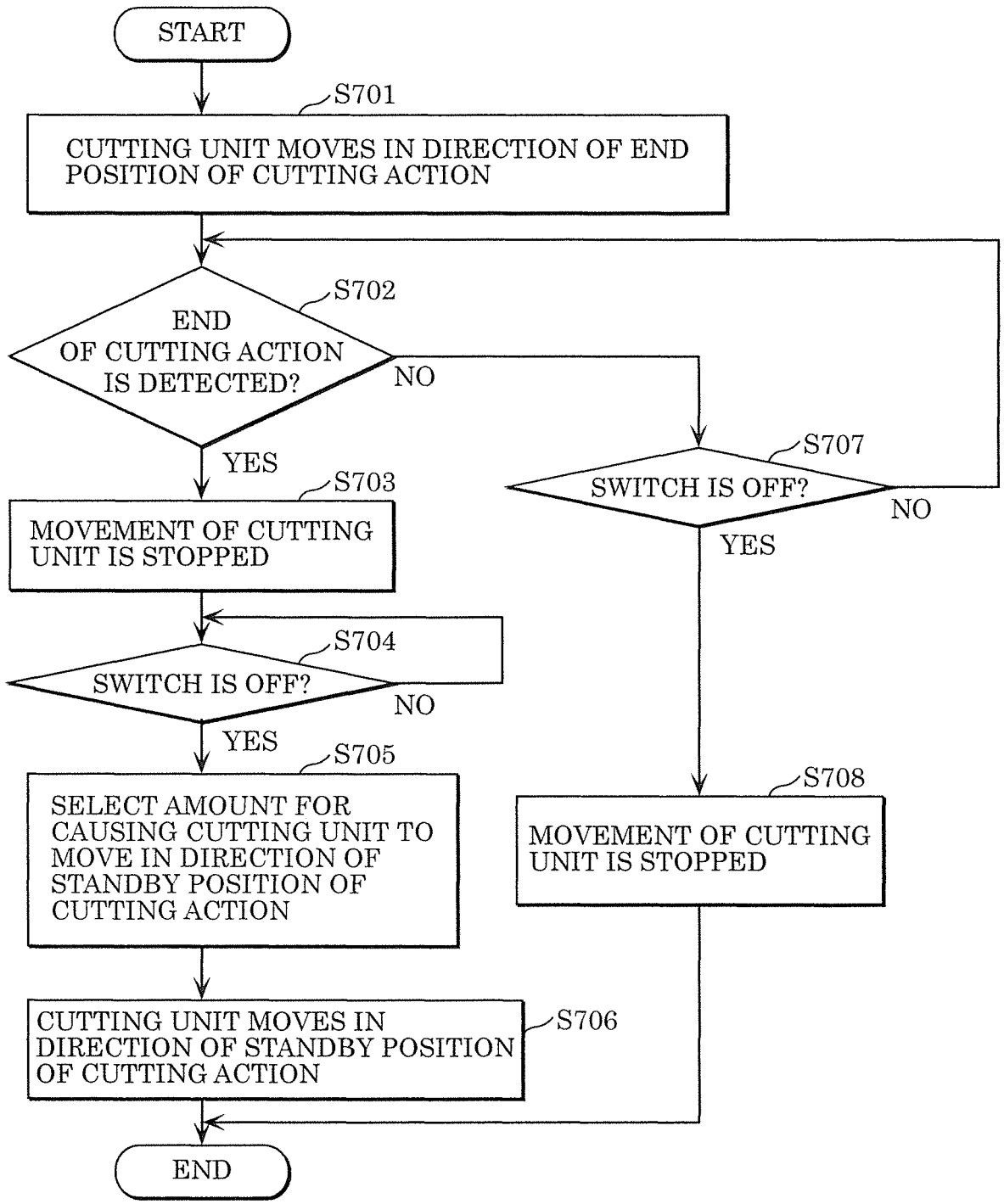
FIG. 13 is a flowchart showing an example of the cutting action of electrical cable cutter 1B in FIG. 12.

FIG. 13 is a flowchart showing an example of the cutting action of electrical cable cutter 1B according to the present embodiment. Note that the various types of controls related to the cutting action of electrical cable cutter 1B described below are, for example, performed via the instructions of a controller (control circuit, processor, or the like) not illustrated in the drawings that is disposed in electrical cable cutter 1B.

As illustrated in FIG. 13, in the present embodiment, by turning on cutting action input unit 20B, cutting unit 11 first moves from the standby position prior to the start of the cutting action in the direction of the end position of the cutting action, and thereby cuts cutting target 2A (S701). Next, the end of the cutting action performed on cutting target 2A is detected (S702). When the end of the cutting action performed on cutting target 2A is detected in S702 ("Yes" in FIG. 13), movement of cutting unit 11 in the direction of the end position of the cutting action (S703) is stopped. Subsequently, it is determined whether cutting action input unit 20B (switch in FIG. 13, same hereinafter) is turned off (S704). Next, when it is determined that cutting action input unit 20B is turned off in S704 ("Yes" in FIG. 13), an amount (movement amount) by which cutting unit 11 is caused to move in the direction of the standby position of the cutting action is selected (S705), and cutting unit 11 is caused to move in the direction of the standby position prior to the start of the cutting action based on the selected movement amount (S706). Moreover, when it is determined that cutting action input unit 20B is not turned off in S704 ("No" in FIG. 13), S703 (stoppage of movement of cutting unit 11) is continued until cutting action input unit 20B is turned off. However, when the end of the cutting action performed on cutting target 2A is not detected in S702 ("No" in FIG. 13), it is determined next whether cutting action input unit 20B is turned off (S707). When it is determined that cutting action input unit 20B is turned off in S707 ("Yes" in FIG. 13), cutting unit 11 is caused to stop moving in the direction of the end position of the cutting action (S708). Moreover, when it is determined that cutting action input unit 20B is not turned off in S707 ("No" in FIG. 13), movement of cutting unit 11 in the direction of the end position of the cutting action is continued until the end of the cutting action is detected in S702.

Figure 14:
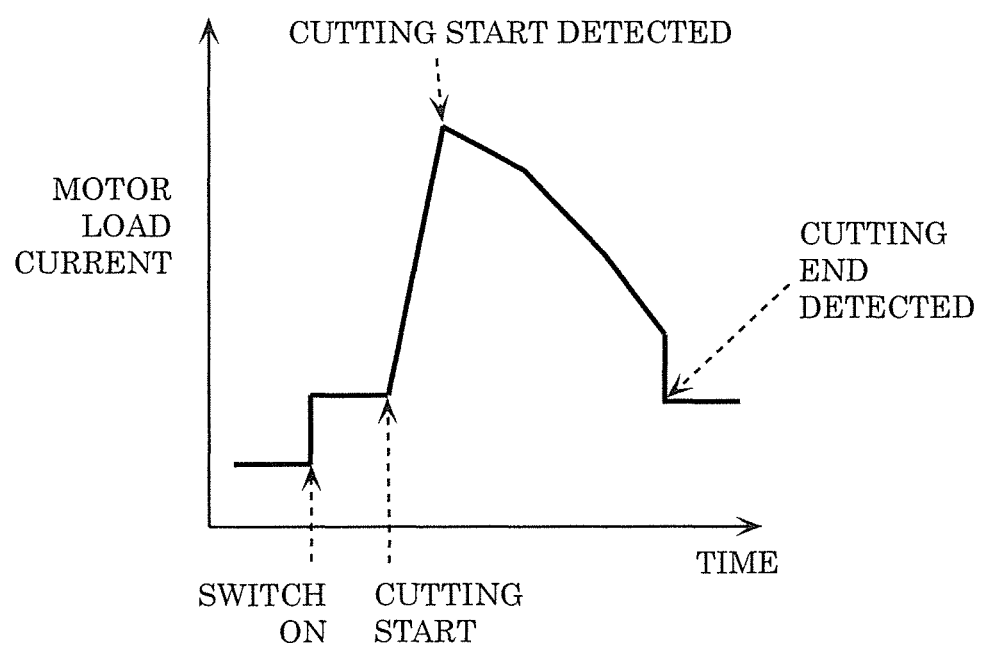
FIG. 14 is an outline diagram for describing an example of detecting an end of the cutting action of electrical cable cutter 1B in FIG. 12.

FIG. 14 is an outline diagram for describing an example of detecting the end of the cutting action of electrical cable cutter 1B according to the present embodiment.

As illustrated in FIG. 14, the detection of the end of the cutting action of electrical cable cutter 1B according to the present embodiment, that is, the detection of the start and end of cutting of cutting target 2A by cutting unit 11, is performed by detecting the value of the motor load current, which is the current for causing the electric motor to move. In other words, the start of cutting of cutting target 2A by cutting unit 11 is detected when the motor load current is greater than or equal to a predetermined value (or in a predetermined range) during or after the start of cutting. Furthermore, the end of cutting of cutting target 2A by cutting unit 11 is detected when the motor load current is less than the predetermined value (or in a predetermined range). When both the cutting start and end are detected, it is determined that the end of the cutting action has been detected in S702 of FIG. 13.

In this manner, detecting both the start and end of cutting makes determining in the case where the cutting action has ended easy, and thus preferable.

Note that in FIG. 13, the selection of the amount (movement amount) by which cutting unit 11 in the present embodiment is caused to move in the direction of the standby position of the cutting action is described as being performed when cutting action input unit 20B (switch in FIG. 13) has been turned off, but the movement amount may also be selected before cutting unit 11 moves in the direction of the end position of the cutting action (S701).

The invention claimed is:

1. A power tool, comprising:
a cutting unit configured to perform a cutting action; and
a cutting action input unit configured to turn the cutting action on and off,
wherein the cutting action input unit is configured to:
when the cutting action input unit is turned on, cause the cutting unit to move in a direction of an end position of the cutting action; and
when the cutting action input unit is turned off, cause the cutting unit to: (i) stop moving in a case where it is detected, by detecting that a motor load current is greater than or equal to a predetermined value, that the cutting action has not ended at a time when the cutting action input unit is turned off, and (ii) move in a direction of a standby position at which the cutting unit was located prior to a start of the cutting action by a movement amount selected from a plurality of preset movement amounts in a case where it is detected that the cutting action has ended at the time when the cutting action input unit is turned off; and
wherein the power tool is configured to select the movement amount using information about a remaining power level of the power tool.

2. The power tool according to claim 1, further comprising:
a movement amount adjuster configured to freely adjust the movement amount in the direction of the standby position.

3. The power tool according to claim 1, wherein
the cutting unit is configured to detect an end of the cutting action by detecting both a cutting start of a cutting target and a cutting end of the cutting target.

4. The power tool according to claim 1, wherein
the power tool is configured to adjust the movement amount by controlling a movement time in which the cutting unit is caused to move in the direction of the standby position.

5. A power tool, comprising:
a cutting unit configured to perform a cutting action;
a cutting action input unit configured to turn the cutting action on and off,
wherein the cutting action input unit is configured to:
when the cutting action input unit is turned on, cause the cutting unit to move in a direction of an end position of the cutting action; and
when the cutting action input unit is turned off, cause the cutting unit to move in a direction of a standby position at which the cutting unit was located prior to a start of the cutting action by a movement amount selected from a plurality of preset movement amounts, using information about set time stored in advance and information about a remaining power level of the power tool.

6. The power tool according to claim 5, wherein
the power tool is configured to adjust the movement amount by controlling a movement time in which the cutting unit is caused to move in the direction of the standby position.

* * * * *